J. L. HARPER.
PNEUMATIC TIRE PUMP.
APPLICATION FILED FEB. 3, 1920.
1,373,068.  Patented Mar. 29, 1921.
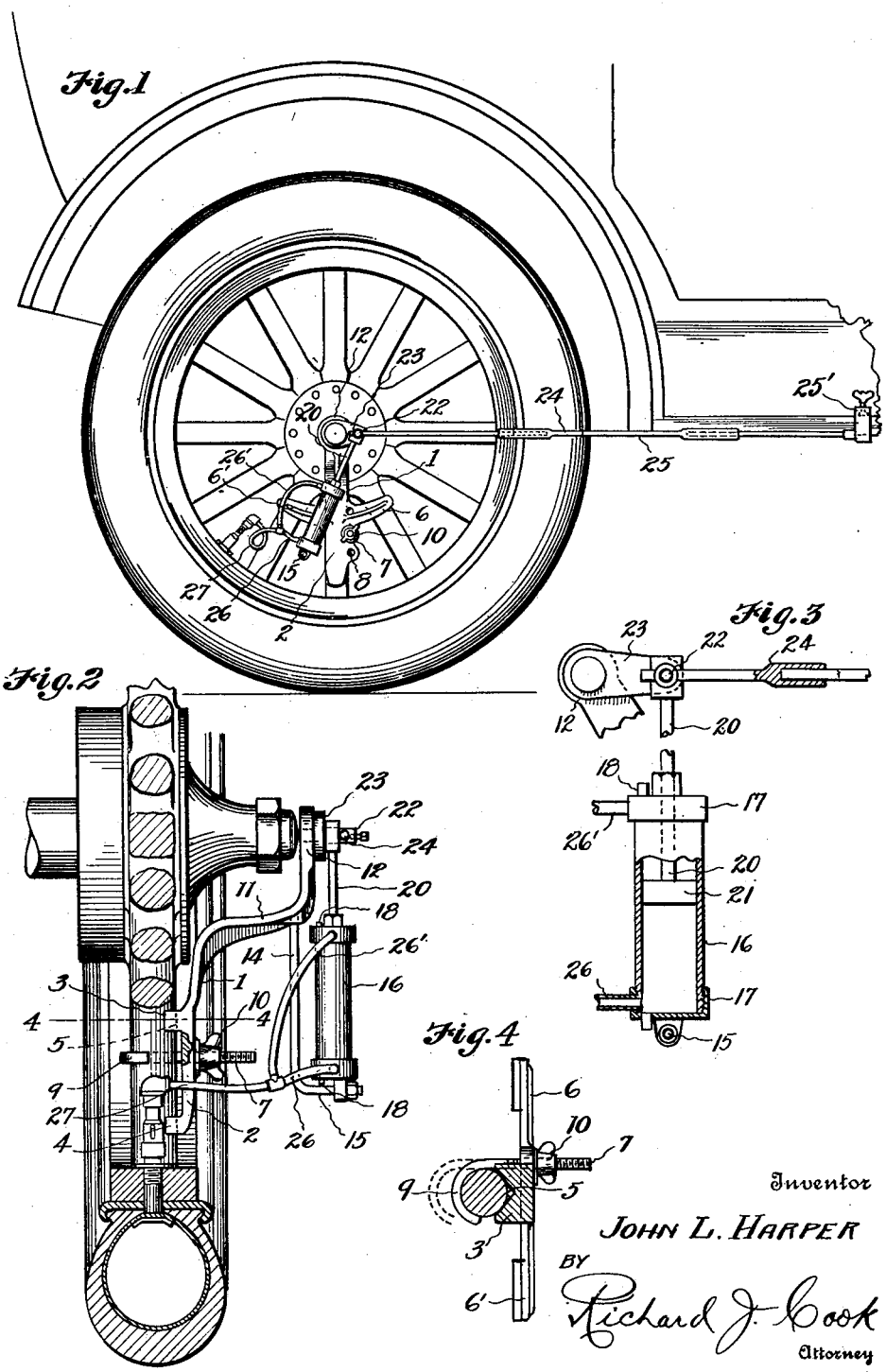
Inventor
JOHN L. HARPER
BY Richard J. Cook
Attorney

UNITED STATES PATENT OFFICE.

JOHN L. HARPER, OF SEATTLE, WASHINGTON.

PNEUMATIC-TIRE PUMP.

1,373,068.  Specification of Letters Patent.  Patented Mar. 29, 1921.

Application filed February 3, 1920. Serial No. 355,897.

*To all whom it may concern:*

Be it known that I, JOHN L. HARPER, a citizen of the United States, and resident of the city of Seattle, county of King, and State of Washington, have invented certain new and useful Improvements in Pneumatic-Tire Pumps, of which the following is a specification.

My invention relates to improvements in pneumatic tire pumps, and more particularly to pumps of that character applicable to the wheel of an automobile, or the like, in such a manner that rotation of the wheel will actuate the pump to fill the tire thereon.

It is the principal object of the invention to provide a pump of the above character which may be easily and quickly mounted upon a wheel, or removed therefrom, and which is of such a character that it will require but very little space for storage and may be conveniently carried with the vehicle.

It is a further object of the invention to provide a device of this character, comprising a double acting pump that is pivotally supported by a bracket adapted to be removably attached to a part, such as a spoke, of the vehicle wheel and which has a piston rod attached to a pivot pin eccentrically located with respect to the vehicle wheel and which is retained in a relatively fixed position by a member extendible to the vehicle body so that as the wheel rotates, the pump will be actuated to fill the tire with which it is attached.

In accomplishing the objects of the invention I have provided the improved details of construction, the preferred forms of which are illustrated in the accompanying drawings, wherein:

Figure 1 is a side view of the rear portion of an automobile, showing a pump embodying the present invention mounted on the vehicle wheel.

Fig. 2 is a side view of the pump and part of the vehicle wheel.

Fig. 3 is an enlarged view of the pump cylinder, parts being in section for better illustration.

Fig. 4 is a cross section on the line 4—4 of Fig. 2.

Referring more in detail to the several figures of the drawing, wherein like reference numerals designate like parts, 1 designates the pump-supporting bracket, which consists of a spoke engaging portion 2 provided on its inner face with two spaced apart bosses, 3 and 4, having notches 5 therein for receiving the spoke of a wheel, and having inwardly curved, laterally extending arms 6 and 6', adapted to overlie and engage the spokes at opposite sides of the mounting spoke so as to give rigidity to the bracket.

The means for attaching the bracket to the spoke consists of a bolt 7, that is extended through one of series of holes 8 along one edge of the outer end of the bracket, and which, at its inner end, has a hook 9 for engaging the spoke and at its outer end has a thumb nut 10 threaded thereon, which may be adjusted against the outer side of the bracket to draw the hook tight and secure the bracket rigidly in place. The inner end of the bracket consists of an outwardly extending portion 11 and a vertically extending end 12 which terminates, when the bracket is properly placed on the wheel, concentrically adjacent the end of the wheel hub.

Fixedly attached to and extending downwardly from the out-turned portion 11 of the bracket is a pump-supporting arm 14, having a laterally and outwardly turned end 15 whereon the end of a pump cylinder 16 is pivotally mounted; the pump cylinder being closed at both ends by caps 17 and also provided at each end with check valves indicated at 18, of a character that will admit air into the cylinder but prevent any discharge therethrough.

Extending through the inner end cap of the pump cylinder is a piston rod 20 which is equipped within the cylinder with a piston 21 and at its outer end is pivotally attached to a pivot pin 22, extending outwardly from an arm or extension 23 that is rotatably mounted on the end section 12 of the bracket; the center about which the arm rotates being concentric with the vehicle wheel, and the pivot pin 22 is retained against movement by means of a series of telescopically joined rods 24 which form an extendible arm 25 that is attached by means of a clamp 25' to a part, such as the foot board, of the vehicle body.

Leading from the opposite ends of the pump cylinder are air tubes 26 and 26', which connect to a tube 27 that, at its end, is attached to the valve stem of the tire. A safety valve of any of the well known types which will prevent excessive pressure within the tire may be included in the connection, if desired.

Assuming that the device is constructed as described, in using the same, it is applied to a vehicle wheel in the manner as shown in Fig. 1, by placing the notched bosses on the inner face of the bracket against a spoke and securing the same on the wheel by placing the hooked end of the bolt 7 about the spoke and tightening the thumb nut against the outer face of the bracket, care being taken to see that the inner end of the bracket and center about which the arm 23 is mounted, is concentric with respect to the wheel hub.

The rod sections which form the arm 25 are then assembled so that they may extend and be attached to any fixed member, such as the foot board or fender of the vehicle.

The wheel is then rotatably driven, either after raising the same from the ground, or by forward movement of the vehicle so that the pump is carried with the wheel as it rotates about the stationary and eccentric pivot point 22, which causes the piston to be reciprocated within the cylinder and air to be forced into the tire.

When the tire is filled, the pump may be removed from the wheel by loosening the bolt 7, and the clamp 26. The sections of the arm 25 may then be disassembled and the parts placed within the tool box of the vehicle.

It is apparent that a pump of this character may be easily and quickly attached or removed from position, will eliminate manual labor in filling a tire and will require very little storage space in the vehicle.

What I claim as new is:

1. The combination with a vehicle wheel of the character described, of a pneumatic tire pump comprising a pump supporting bracket removably mounted on a spoke of the wheel and having its inner end extending to the axial center of the wheel, a pump cylinder pivotally supported from said bracket, and having air tube connection with the tire of the wheel, an arm pivotally mounted on the bracket in the axial line of the wheel, and having an extension adapted to be fixed to a non-movable point to prevent rotation of the arm with the bracket, a pivot pin extending from said arm eccentric of the wheel, and a piston rod for the pump attached to said pivot pin so that rotation of the wheel actuates the pump to fill the tire.

2. The combination with a vehicle wheel of the character described, of a bracket having spaced apart notched bosses on the inner face thereof adapted to receive a spoke of the wheel therein, and having laterally extending arms adapted to overlie adjacent spokes, a clamping bolt extended through the bracket having a hook at its inner end engageable with the mounting spoke to secure the bracket rigidly thereon, an arm revolubly mounted on the bracket in the axial line of the wheel, a pivot pin extended from the arm eccentric of the wheel, an air pump pivotally supported at one end from said bracket and having air connection with the wheel tire, a pump piston rod extending from the pump and attached to said eccentrically located pin and an extension from the pin adapted to be attached to a fixed point to prevent rotation of the pin with the bracket so that rotation of the wheel will actuate the pump piston.

3. The combination with a vehicle wheel of the character described, of a pneumatic tire pump connected with the tire and having a supporting bracket removably attached to a spoke of the wheel; the inner end of the bracket being extended to the axial line of the wheel, an arm rotatably mounted on the bracket concentric with the wheel, a pivot pin extended from the arm eccentric of the wheel, a piston rod for the pump attached to said eccentric pivot pin, and an arm extending from the pin consisting of a plurality of telescopically connected links. the outer one of said links having a clamp thereon to be attached to a non-movable part of the vehicle to prevent revolution of the arm and pivot pin with the pump, for the purpose set forth.

Signed at Seattle, Washington, this 15th day of January, 1920.

JOHN L. HARPER.